US006178517B1

United States Patent
Bertin et al.

(10) Patent No.: US 6,178,517 B1
(45) Date of Patent: Jan. 23, 2001

(54) HIGH BANDWIDTH DRAM WITH LOW OPERATING POWER MODES

(75) Inventors: Claude L. Bertin, S. Burlington; Timothy J. Dell, Colchester; Erik L. Hedberg; Mark W. Kellogg, both of Essex Junction, all of VT (US)

(73) Assignee: International Business Machines Corporation, Armonk, NY (US)

( * ) Notice: Under 35 U.S.C. 154(b), the term of this patent shall be extended for 0 days.

(21) Appl. No.: 09/121,933

(22) Filed: Jul. 24, 1998

(51) Int. Cl.[7] ................................................... G06F 12/00
(52) U.S. Cl. ............................ 713/324; 711/5; 711/105; 365/230.02; 365/230.03; 710/128
(58) Field of Search ............................... 711/5, 105, 149, 711/211; 710/126, 127, 128, 131; 369/230.02, 230.03, 230.05, 189.02; 713/324

(56) References Cited

U.S. PATENT DOCUMENTS

| 4,514,808 | | 4/1985 | Murayama et al. | 364/200 |
|---|---|---|---|---|
| 5,036,493 | * | 7/1991 | Nielsen | 365/230.03 |
| 5,404,543 | * | 4/1995 | Faucher et al. | 395/750 |
| 5,860,106 | * | 1/1999 | Domen et al. | 711/137 |
| 5,870,350 | * | 2/1999 | Bertin et al. | 365/233 |
| 5,875,345 | * | 2/1999 | Naito et al. | 395/750.05 |
| 5,892,729 | * | 4/1999 | Holder, Jr. | 365/233 |
| 5,896,515 | * | 4/1999 | Aota et al. | 395/309 |
| 5,923,829 | * | 7/1999 | Ishii et al. | 395/182.05 |

FOREIGN PATENT DOCUMENTS 5-165761   7/1993 (JP).

OTHER PUBLICATIONS

Prince, Betty. High Performance Memories: New Architecture DRAMs and SRAMs—Evolution and Function. 1996. pp. 212–227.*

* cited by examiner

Primary Examiner—Eddie P. Chan
Assistant Examiner—Kevin Verbrugge
(74) Attorney, Agent, or Firm—McGuireWoods, LLP; Robert A. Walsh

(57) ABSTRACT

A high bandwidth DRAM is provided with two separate bus networks connecting the DRAM to a processor. One bus network is a high speed (e.g., 500 MHZ) 8:1 or 16:1 multiplexed I/O bus and the second is a slower (e.g., 64-bit) bus. The high-speed bus is used for example for graphic intensive applications which require fast access to large numbers of bits in the DRAM memory array. This of course results in higher power requirements. Since, not all applications require such large amounts of data to be transferred between the DRAM and the processor, the slower bus is provided for these less demanding applications such as word processors, spreadsheets, and the like. The slower bus requires less power to operate and therefore results in a power saving mode which, among other things, facilitates longer battery life.

11 Claims, 4 Drawing Sheets

HIGH BANDWIDTH DRAM WITH LOW OPERATING POWER MODES

BACKGROUND OF THE INVENTION

1. Field of the Invention

The present invention generally relates to high bandwidth/performance Dynamic Random Access Memories (DRAMs) and, more particularly, to high bandwidth/performance DRAMs with low power operating modes.

2. Description of the Related Art

Dynamic random access memory (DRAM) performance is a well known limitation to computer system performance. Processor speeds are rapidly outpacing main memory performance, with both processor designers and system manufacturers developing higher performance memory subsystems in an effort to minimize performance limitations due to the slower DRAM devices. Ideally, the memory performance would match or exceed processor performance, i.e., a memory cycle time would be less than one processor clock cycle. This is almost never the case and, so, the memory is a system bottleneck. For example, a state of the art high speed microprocessor may be based on a 200 MegaHertz (MHZ) clock with a 5 nanosecond (ns) clock period. A high performance DRAM may have a 60 ns access time, which falls far short of processor performance.

This system bottleneck is exacerbated by the rise in popularity of multimedia applications. Multimedia applications demand several times more bandwidth for main memory or frame-buffer memory than computational intensive tasks such as spread sheet analysis programs or, other input/output (I/O) intensive applications such as word processing or printing.

Extended Data Out (EDO) and Synchronous DRAMs (SDRAMs) were developed to improve bandwidth. However, SDRAMs and EDO RAMs still do not match processor performance and, therefore, still limit system performance. Consequently, as faster microprocessors are developed for multimedia processing and high performance systems, faster memory architecture is being developed to bridge the memory/processor performance gap, e.g., wide I/O DRAMs.

Recent developments predict a major turning point for memory devices and related subsystems with a shift to high speed/narrow I/O devices. These high bandwidth (data rate) DRAMs achieve the high data rate by accessing a large number of bits in an array, then multiplexing by 8:1 to achieve clocked data rates in excess of 500 MHZ.

For example, referring to FIG. 1, there is shown a high speed I/O DRAM memory device of the type sought to be improved by the present invention. A 64 Mb memory array comprises four 16 Mb (64×256×1024) sub-arrays 10, 12, 14, and 16. Each of the sub-arrays are buffered by a page register 20, 22, 24, and 26, respectively. The page registers are organized as 64×256 bit addresses (i.e., 2 Kb). Data to and from the page registers 20, 22, 24, and 26 are transferred on a sixty-four bit bus 30 from driver 32 or buffer 34. Buffer 34 passes data from the sixty-four bit bus 30 to an 8:1 multiplexer (MUX) 36 and, in turn, the multiplexer 36 passes the data off chip to I/O pins 38 DQ0–DQ8. The sixty-four bit bus 30 permits eight bursts of eight bits. Similarly, data in from the I/O pins 38 are received by a 1:8 demultiplexer (DEMUX) 40 which, under the control of control logic 42 and data mask register 44, is passed by the driver 32 to the sixty-four bit-bus 30. In a page read operation, the first access row address and commands are piped into the control logic 42 via the I/O pins 38 DQ0–DQ8 in parallel. For a given address, it will require eight bursts of eight-bit bytes to read out the sixty-four bit wide page register. During this time, the next column address and commands are serially scanned into the address pin 46 and command 47 pin, one bit at a time for eight successive clock cycles, until a new command/data packet is scanned in. RXCLK and TXCLK are used for external handshaking.

The above high bandwidth approach achieves the high data rate by accessing a large number of bits in an array resulting in high power dissipation requirements. For systems with a battery power option, this large power dissipation severely limits battery life. For high resolution graphics displays, the high data rate is needed. However, for many applications, such word processors, spreadsheets, etc., it is not necessary to operate at such high rates and high power usage.

Thus, there is a need in the art for a DRAM memory which operates in either a high bandwidth mode or low power mode while maintaining a constant clock frequency.

SUMMARY OF THE INVENTION

It is therefore an object of the present invention to provide a high speed/narrow I/O dynamic random access memory (DRAM) which operates at a high bandwidth mode for accommodating, for example, graphic intensive applications, or in a low power mode for accommodating, for example, word processing or spreadsheet applications.

It is yet another object of the present invention to provide a high speed/narrow I/O DRAM where the speed/power mode can be adjusted to accommodate various applications.

According to the present invention, a high bandwidth DRAM is provided with two separate bus networks connecting the DRAM to a processor. One bus network is a high speed (e.g., 500 MHz) 8:1 multiplexed I/O bus and the second is a slower (e.g., 64-bit) bus. The high-speed bus is used for example for graphic intensive applications which require fast access to large numbers of bits in the DRAM memory array. This of course results in higher power requirements. Since, not all applications require such large amounts of data to be transferred between the DRAM and the processor, the slower bus is provided for these less demanding applications such as word processors, spreadsheets, and the like. The slower bus requires less power to operate and therefore results in a power saving mode which, among other things, facilitates longer battery life.

Each of the two bus networks may be completely separate or may share bus lines. For example, the slower bus may be 64-bits wide and the high-speed bus only 8-bits wide. Alternatively, the slower bus may be 56-bits wide. In this case in a high bandwidth mode, both the 56-bit bus and the 8-bit bus are utilized to accommodate the transfer of 64 bits between the DRAM and the processor for low power operation. In either case the processor selects the appropriate bus or combination of busses to accommodate the needs of the current application. This may be accomplished via processor generated instructions to a chip set.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
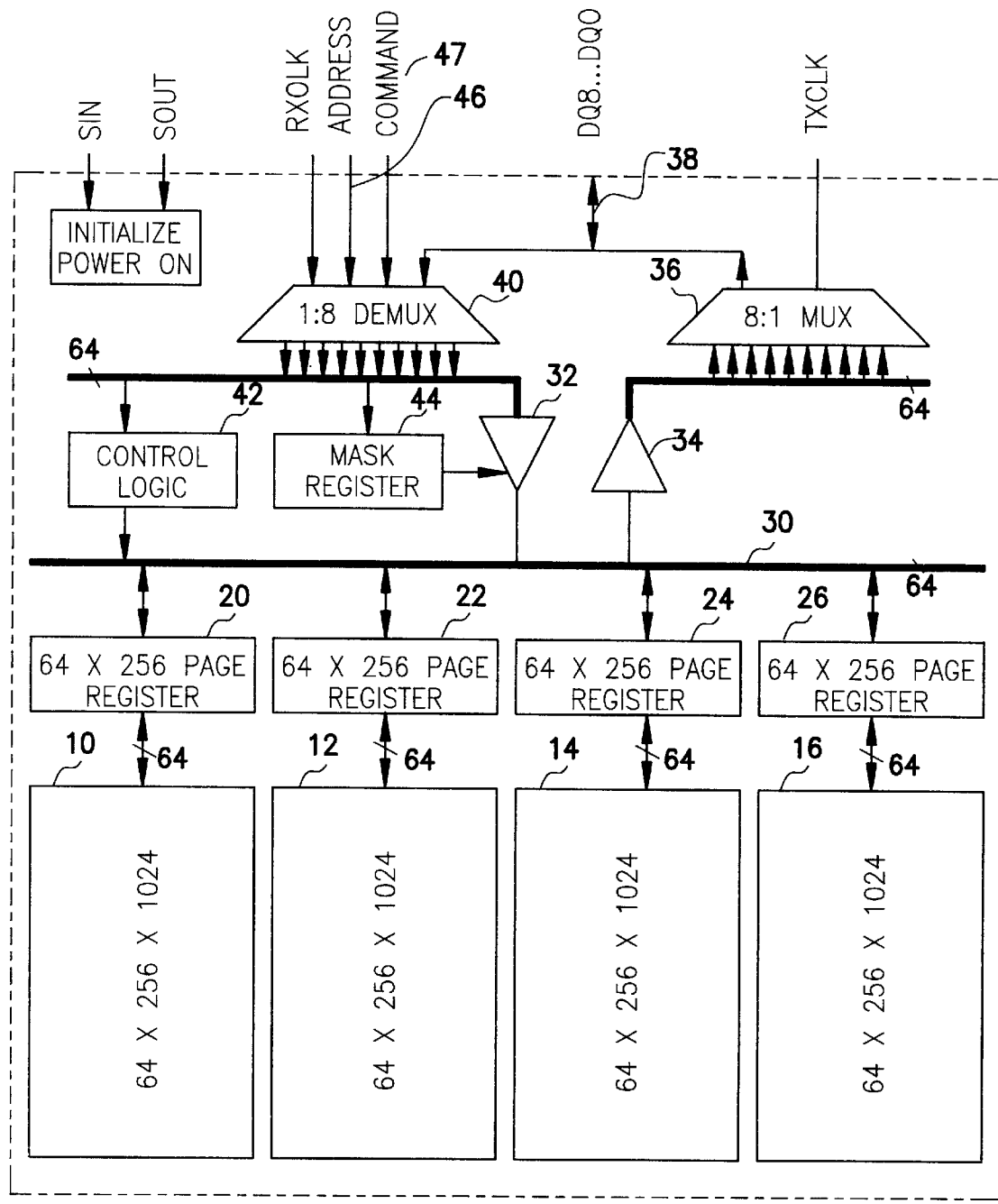
FIG. 1 is a circuit diagram of a related art high-speed dynamic random access memory.
Figure 2:
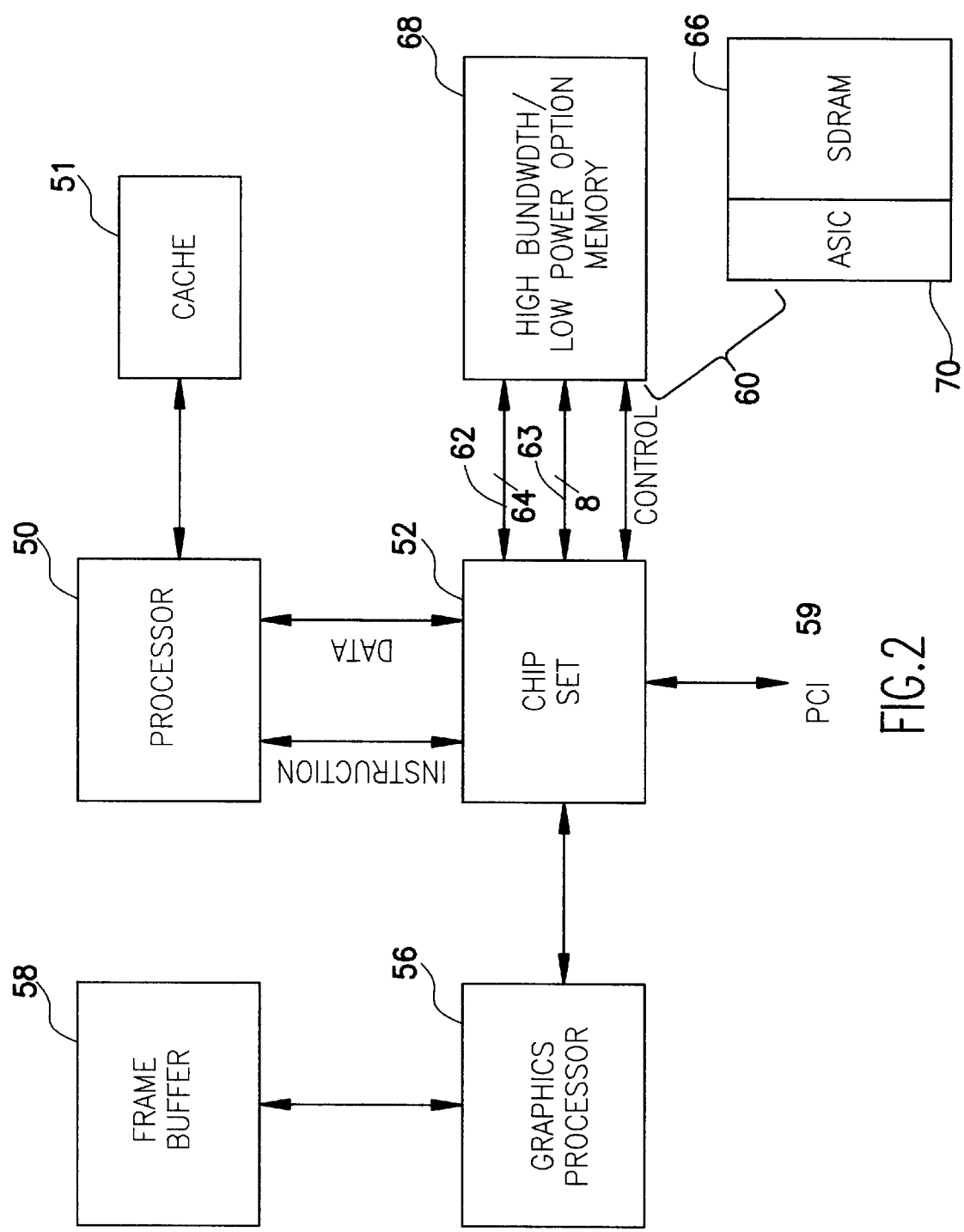
FIG. 2 is a block diagram of a memory system according to a first embodiment of the present invention alternately connecting the processor and a memory with a high-speed bus or a low power bus.
Figure 3:
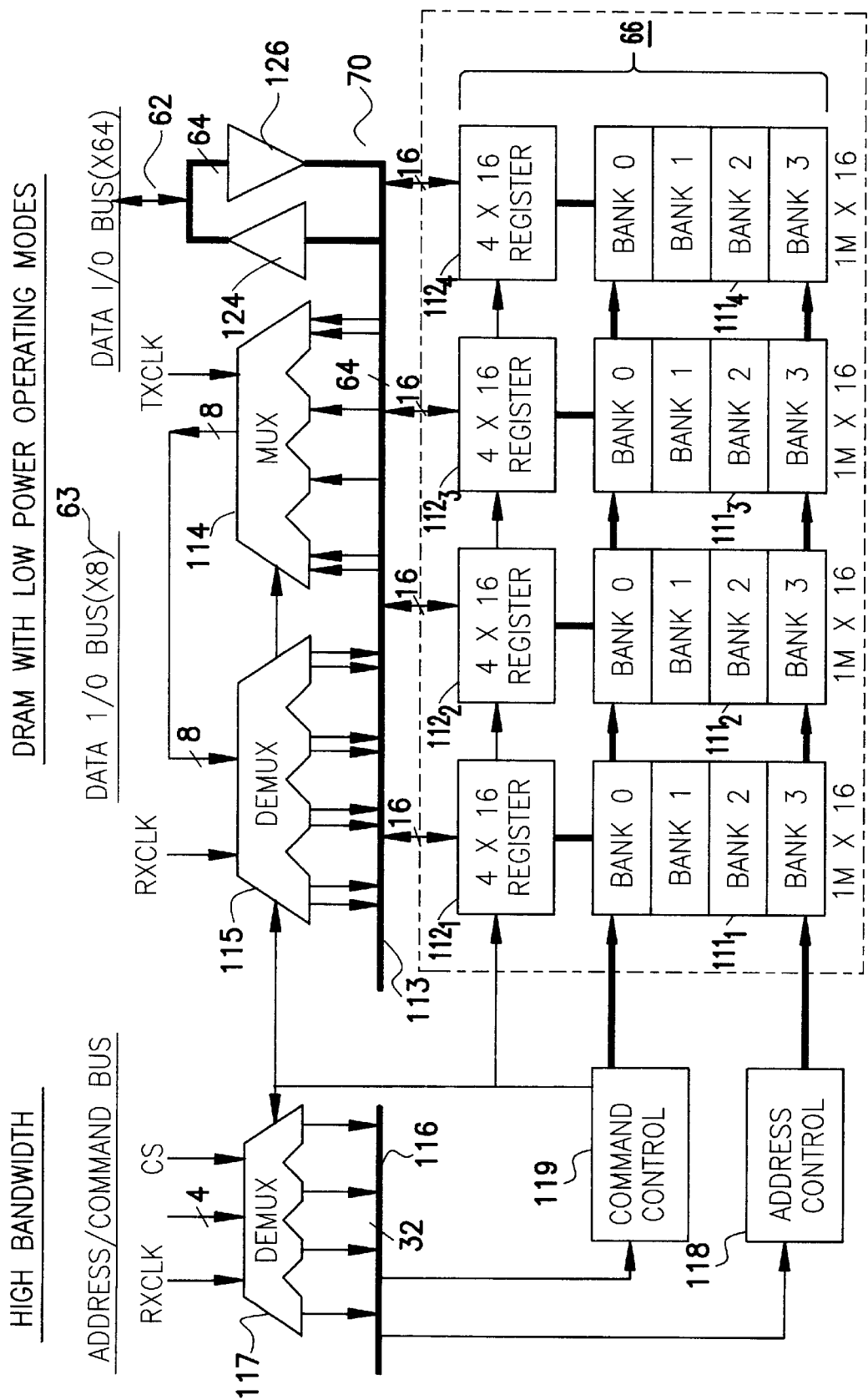
FIG. 3 is a circuit diagram of an SDRAM with a low power operating mode according to a second embodiment of the present invention.

Referring now to the drawings, FIG. 2 shows a processor 50 and associated cache memory 51 connected to a chip set 52. The chip set is connected to a graphics processor 56 and a frame buffer 58 as well as a peripheral component interconnection bus (PCI) 59. The processor 50 is additionally connected to a dynamic random access memory (DRAM) 60. According to the invention, the DRAM 60 is selectively connected to the processor 50 via the chip set 52 by either a high-speed bus 63 or a slower, less power consuming bus 62. The chip set may be, for example, the INTEL PENTIUM 430, 440, or 450 series chipsets. The memory 60 may be, for example, a synchronous DRAM (SDRAM) 66 and application specific integrated circuit (ASIC) 70, as shown in FIG. 3 or a high-bandwidth DRAM 68 as shown in more detail in FIG. 4. In the case of an SDRAM 66 the application specific integrated circuit (ASIC) 70 is required to interface between the high speed bus 63 and the slower bus 62. In the case of a high-bandwidth DRAM 68 all of the necessary hardware to interface the DRAM to the buses is preferably integrated in a single device.

Referring now to FIG. 3 there is shown a 64-megabit- (Mb) RAM module 66 with a ASIC interface 70 which is a modification of the device disclosed in U.S. Pat. No. 5,870, 350, herein incorporated by reference. The RAM module 66 includes four 16-Mb SDRAMs $111_1$ to $111_4$. Each of the four 16 Mb SDRAMs $111_1$ to $111_4$ has four banks. Page depth and data bandwidth is maintained, comparable to that of other high bandwidth architectures, by activating one bank in each of four SDRAMs in parallel in a burst-of-four operation. During a read operation, command control 119 and address control 118 select data from Bank 0, for example, on all four SDRAMs $111_1$ to $111_4$, which is passed to the 4×16 registers $112_1$ to $112_4$, respectively.

Once the data is loaded, two bytes at a time are passed from each register $112_1$–$112_4$ onto a 64-bit bus 113. A multiplexer 114 synchronously selects each byte as one of eight blocks from the 64 bit bus 113. The eight blocks are clocked sequentially to the data I/O bus. Data is pipelined so that, in parallel with transferring data from register $112_1$–$112_4$ across the 64-bit bus 113 to the multiplexer 114, the next block of data can be read from the SDRAMs $111_1$–$111_4$ and passed to the inputs of registers $112_1$–$112_4$. This next block is, in turn, stored and then, passed out in a first in, first out (FIFO) type manner.

Commands and addresses are loaded sequentially during a Request Packet Command. Commands are demultiplexed onto a 32-bit bus 116 to produce a parallel instruction format for the Address Control 118 and Control Logic 119. The Control Logic 119 controls a conventional (Jedec standard) SDRAM $111_1$–$111_4$ for parallel operation.

During a write operation, high speed clocks sequentially pass bytes of data to the 64-bit bus 113 through demultiplexer 115 in parallel with sequentially loading address and command control information onto a 32-bit bus 116 through demultiplexer 117. Starting addresses and commands from the 32 bit bus 116 are stored in the Address Controller 118 and the Command Controller 119, which maintain compliance with SDRAM handshaking protocol.

Command Control 119 decodes and issues commands to the registers $112_1$ to $112_4$, multiplexer 114, demultiplexers 115, 117 and SDRAMs $111_1$ to $111_4$. The command controller 119 also steers data between the Data I/O Buses, 62 or 63, and the internal 64-bit bus 113 through demultiplexer 115.

A Chip Select (CS) signal enables the command demultiplexer 117 and initiates loading commands onto the 32-bit bus 116. Once loaded from the 32-bit bus 116, controllers 118 and 119 independently select and access selected locations in the SDRAMs $111_1$ to $111_4$ to transfer thirty-two bytes of data (eight bytes from each SDRAM $111_1$ to $111_4$). The 32-bit address/command bus 116 includes sixteen address bits and sixteen command bits. Commands can include, but are not limited to:

1) Mode Register Set
2) Bank Active
3) Bank Precharge
4) Read
5) Read with Auto precharge
6) Write
7) Write with Auto precharge
8) Bank Activate/Read
9) Bank Activate/Write
10) Precharge/Bank Activate/Read
11) Precharge/Bank Activate/Write
12) Auto-Refresh
13) Self-Refresh
14) Power Down
15) Power Up
16) Data Masking According to the invention, the SDRAM 66 memory can interface to both a high-speed 8:1 multiplexed bus 63 as described above, and a slower, less power consuming 64-bit bus 62. The high speed bus 63 operates at, for example 500 MHZ. The high speed bus is sized to accommodate the maximum burst rate of the memory. In high bandwidth operation, all four SDRAMs $111_{1-4}$ are accessed for reads or writes. As described above, data from the SDRAMs $111_{1-4}$ are fed into a respective 4×16 register 1121-4 which provide data to the 64 bit internal bus 113 which clocks data through the mixing network 114–115 to the memory I/O connected to the high-speed bus 63. High data bandwidth is achieved by continually assessing the all SDRAMs via Command Control 119 and Address Control networks 118.

In contrast, during low power operation a lower speed I/O Bus 62 is provided with an input buffer 126 and an output buffer 124. For low power operation, the Command Control 119 only activates one SDRAM, for example $111_1$, under 4×16 burst mode. The internal 64 bit bus 113 is filled by all the data received by one SDRAM $111_1$ and outputs or inputs the data via the 64 bit I/O buffers, 124 and 126, to the low power I/O Bus 62. Accordingly, since only one of the four SDRAMs is accessed, power is conserved.

Figure 4:
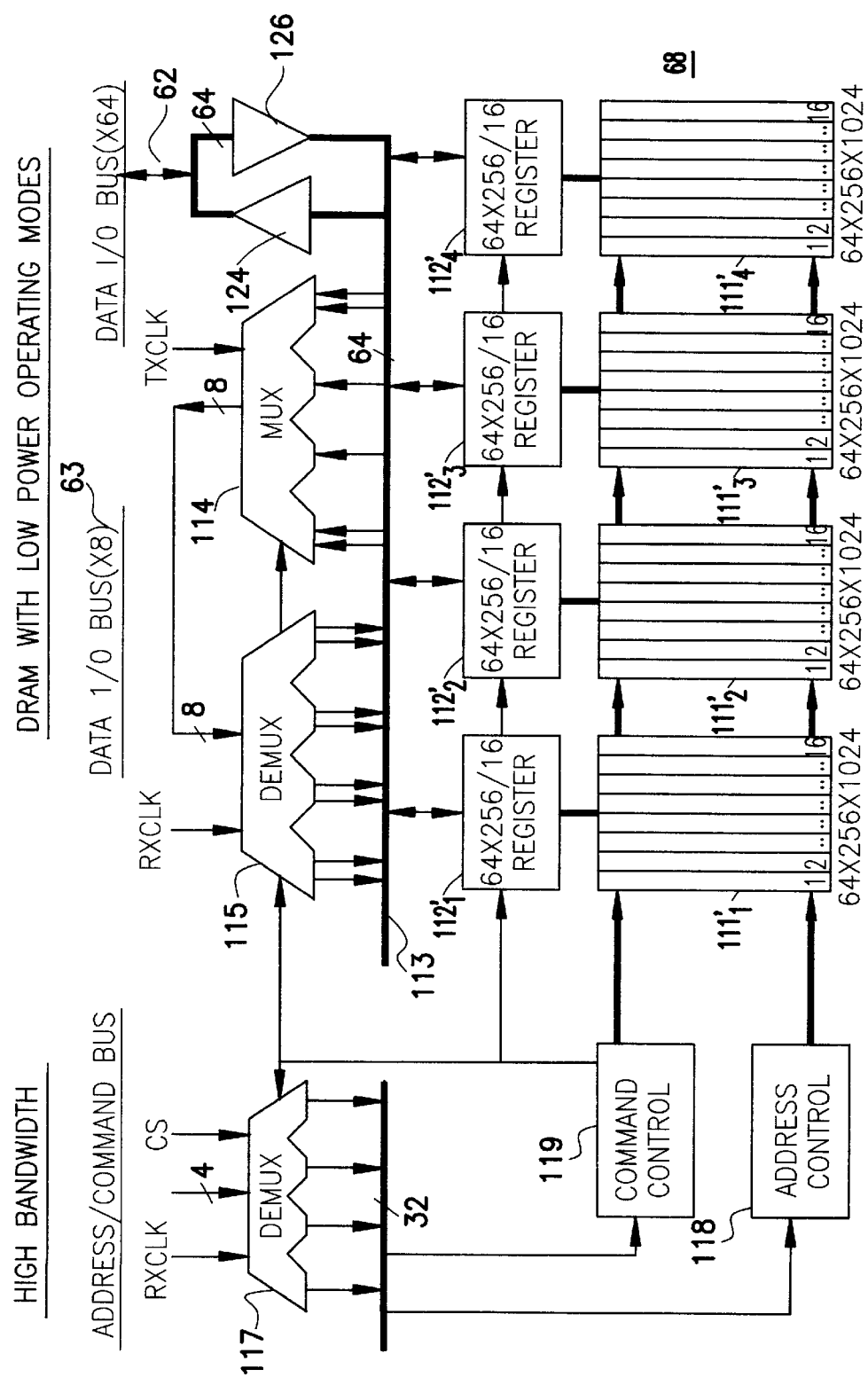
FIG. 4 is a high-bandwidth DRAM with a low power operating mode according to the present invention.

Referring now to FIG. 4, there is shown a two bus system using high-bandwidth DRAM memory 68 which has been configured to accommodate the separate 64 bit bus 62 similar to the SDRAM and ASIC shown in FIG. 3 with like components similarly labeled. In the case, an ASIC is not required as all of the necessary interfacing components are integrated in a single chip. The four banks of memory $111_1'$–$111_4'$ subdivided into 16 word-line segments. These word-line segments can be accessed individually during low power operation. Each word-line segment pumps out 16 bits (2 bytes). During high power operation all 16 segments are activated to pump out 256 bits.

During low power operation, bank addresses in the command packet are redefined to accept a 14 bit wordline address and a 4 bit page address. This redistribution of input addresses does not change the command packet format, the memory chip redefines these addresses as they are input with the command packet. Thus, low power and high bandwidth operations can be switched real time for battery back-up mode. The additional word addresses allow wordlines in the array to be segmented. Once segmented, a significant power savings can be realized. This does reduce the page depth to 64×16 bits which are fed to the internal bus via 4 CAS addresses. Data is then clocked out through the 64 I/O buffers.

The bus architecture of the preferred embodiment may be a single chip or may be on a card and include standard SDRAM chips with an ASIC for multiplexing, providing future SDRAM generation performance with present day parts.

Alternatively, all logic functions in the preferred embodiment, such as the multiplexers, controls, and registers could be integrated onto a standard processor for high speed memory handling. Standard SDRAMs may be located electrically near this integrated processor for very high data and low latency access rates.

While the invention has been described in terms of a single preferred embodiment, those skilled in the art will recognize that the invention can be practiced with modification within the spirit and scope of the appended claims.

We claim:

1. A memory bus system having a low power mode for transferring data between a dynamic random access memory (DRAM) and a processor, comprising:
    a first, high-speed bus connected to a DRAM;
    a second, slower bus connected to the DRAM, said second bus requiring less power to operate than said first bus; and
    a switching circuit, connected to the processor, for alternately switching between a first mode and a second lower power mode,
    said first mode comprising accessing a plurality of addressable memory locations in said DRAM and transferring data on said first, high-speed bus connected to the processor, and
    said second low power mode comprising segmenting said DRAM and accessing less than all of said plurality of addressable memory locations in said DRAM and transferring data on said second, slower bus connected to the processor.

2. A memory bus system for transferring data between a dynamic random access memory (DRAM) and a processor as recited in claim 1 wherein said first bus comprises an 8-bit multiplexed bus and said second bus comprises a 64-bit bus.

3. A memory bus system for transferring data between a dynamic random access memory (DRAM) and a processor as recited in claim 1 wherein said switching circuit comprises a chip set connecting said processor to said first and said second buses.

4. A dual mode memory system having a low power mode for transferring data between a dynamic random access memory (DRAM) and a processor, comprising:
    a plurality of addressable memory devices connected by an internal bus;
    a high-bandwidth data input/output port connected to said internal bus;
    a lower-bandwidth data input/output port connected to said internal bus,
    wherein in a high-bandwidth mode all of said plurality of addressable memory devices transfer data over said internal bus to said high-bandwidth data input/output port, and
    in a low power mode, said DRAM is segmented so that less than all of said plurality of addressable memory devices transfer data over said internal bus to said lower-bandwidth data input/output port.

5. A dual mode memory system as recited in claim 4, further comprising:
    a first, high-bandwidth bus connected to said high-bandwidth data input/output port;
    a second, lower-bandwidth bus connected said lower-bandwidth input/output port; and
    switching circuit, connected to the processor, for alternately connecting said processor to one of said first bus for a high-bandwidth mode data transfer and said second bus for a lower-bandwidth, low power mode data transfer.

6. A dual mode memory system as recited in claim 5 wherein said first bus comprises an 8-bit multiplexed bus and said second bus comprises 64-bits.

7. A dual mode memory system as recited in claim 5 wherein said switching circuit comprises a chip set connecting the processor to said first and said second buses.

8. A dual mode memory system as recited in claim 7 wherein said first bus and said second bus are simultaneously used for said low power mode.

9. A memory system having an adjustable bandwidth mode for accommodating the memory access bandwidth required by an application running on an associated processor, comprising:
    a plurality of addressable memory arrays;
    switch means for selecting between a high bandwidth mode and a second lower bandwidth mode, a clock frequency of said plurality of addressable memory arrays being the same in either mode,
    wherein in said high bandwidth mode all of said plurality of addressable memory arrays are accessed and data is transferred over a first bus, and
    wherein in the second lower bandwidth mode, only a portion of said addressable memory arrays are accessed and data is transferred over a second bus thereby consuming less power.

10. A memory system having an adjustable bandwidth mode as recited in claim 9 wherein in said lower bandwidth mode, only one of said plurality of addressable memory arrays is accessed.

11. A memory system having an adjustable bandwidth mode as recited in claim 9 wherein each of said plurality of addressable memory arrays are subdivided into word-line segments which are individually accessed in the lower bandwidth mode.

* * * * *